United States Patent [19]

Kawamura et al.

[11] Patent Number: 5,732,294
[45] Date of Patent: Mar. 24, 1998

[54] STILL CAMERA AND METHOD FOR USING SAME

[75] Inventors: Koichiro Kawamura, Ichihara; Ryo Uehara, Yokohama, both of Japan

[73] Assignee: Nikon Corporation, Tokyo, Japan

[21] Appl. No.: 794,534

[22] Filed: Feb. 3, 1997

[30] Foreign Application Priority Data

Feb. 9, 1996 [JP] Japan ................... 8-023901

[51] Int. Cl.⁶ ............... G03B 17/40; G03B 17/48
[52] U.S. Cl. ........................... 396/263; 396/432
[58] Field of Search ........................ 396/263, 266, 396/432; 359/363

[56] References Cited

U.S. PATENT DOCUMENTS 4,021,825  5/1977  McCann et al. ................ 396/432
4,279,487  7/1981  Baker et al. .................... 396/432
5,424,788  6/1995  Satake et al. .................. 396/432

*Primary Examiner*—W. B. Perkey
*Attorney, Agent, or Firm*—Oliff & Berridge PLC

[57] ABSTRACT

A still camera (electronic still camera, silver halide still camera, etc.) is provided that performs microphotography without blurring caused by inherent camera vibrations. The still camera includes a front curtain drive assembly that starts a front curtain of the mechanical shutter assembly substantially simultaneously with the driving of a quick-return mirror. A time-monitoring device monitors the passage of time until vibrations caused by the quick-return mirror moving to a position outside of the optical axis position are eliminated. The time-monitoring device can further monitor the time until vibrations caused by driving the front curtain are eliminated. When the time-monitoring device determines that the time required to eliminate the vibrations has elapsed, an exposure time control device starts the electronic shutter assembly.

20 Claims, 6 Drawing Sheets

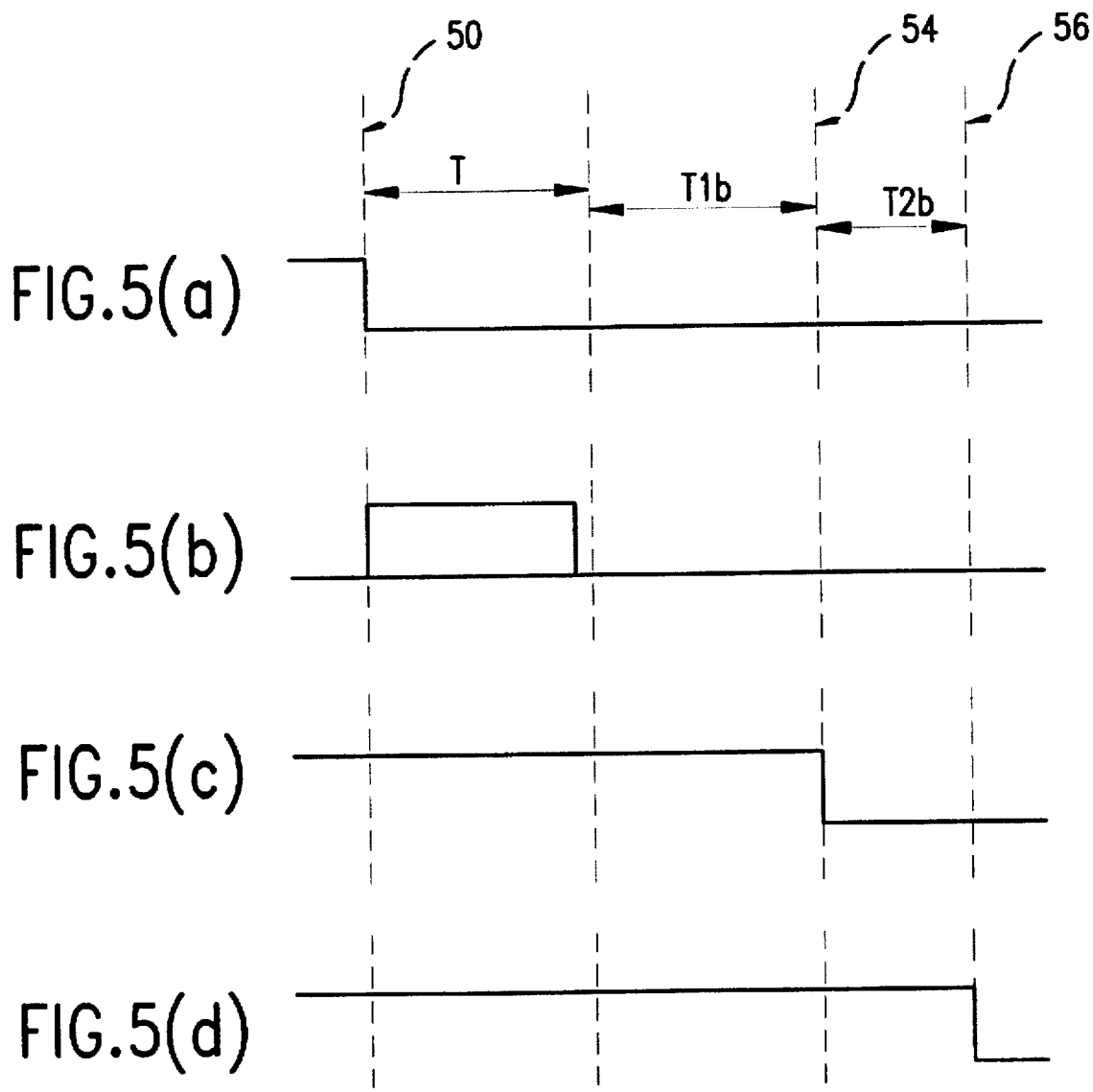

STILL CAMERA AND METHOD FOR USING SAME

BACKGROUND OF THE INVENTION

1. Field of Invention

The present invention relates to a still camera, such as an electronic still camera, silver halide still camera, etc., and in particular, to controlling release sequences of the still camera during microphotography.

2. Description of Related Art

A conventional still camera includes a mechanical shutter device with a front curtain to expose a light-receiving plane of an imaging device and a rear curtain to block the light-receiving plane of the imaging device after a photograph exposure is complete. The conventional still camera further includes a quick-return mirror that responds to depression of a release switch by moving instantly to a position outside of an optical axis position. The quick-return mirror returns to the original optical axis position when the shutter closes to complete the photograph. The imaging device also includes functions to record the captured image data on recording media by digital conversion. The electronic still camera can then reproducibly output the recorded image data to an external reproduction device.

A time chart of release operation sequences from release to the photograph exposure complete for a conventional electronic still camera is shown in FIGS. 6(a)–6(d). Release switch timing is shown in FIG. 6(a). When the release switch is turned ON, the quick-return mirror (also referred to as "mirror") responds immediately by moving to a position outside of an optical axis position. This action is referred to as "mirror-up". Release ON 60 is shown in FIG. 6(a). After a time T, which is required for the mirror-up action has passed, the front curtain is driven to initiate exposure of the photograph. The mirror up action timing is shown in FIG. 6(b). Front curtain timing including front curtain start 64 is shown in FIG. 6(c). After a specified time T2b has passed, the rear curtain is driven to block the light and stop exposure of the photograph. Rear curtain start 66 and the rear curtain control timing are shown in FIG. 6(d).

Thus, the time T required for mirror-up is the time from turning ON the release switch to the shutter starting to open. The time T2b is the exposure time of the photograph.

In a silver halide still camera using photographic film as the imaging medium, generally, the front curtain starts almost simultaneously with the mirror-up start. Conventional microphotography use a dedicated camera, however, some microphotography cameras can use ordinary photographic film. However, when digitally processing the photographed image data in the camera, the total processing work is complicated because additional processing is necessary after having first acquired the photographed picture with a scanner or the like. As described above, conventional electronic still cameras can reproduce and transmit the obtained image data outside the electronic still camera. Thus, when performing microphotography using conventional electronic still cameras, the direct image data can be processed outside the camera to improve efficiency in processing operations.

A dedicated microphotographic camera is a specially designed camera, which can not casually photograph in an arbitrary location. In this respect, although a silver halide still camera uses ordinary photographic film, a need exists for a still camera that can casually perform microphotography in an arbitrary time and place.

Further problems exist when performing microphotography with conventional still cameras because vibrations are caused in the camera by driving the quick-return mirror and the front curtain of the mechanical shutter. In microphotography, the influence of these vibrations cause the photographed pictures to become blurred. Thus, there exists a need for a still camera that can solve vibration problems when performing microphotography.

SUMMARY OF THE INVENTION

It is an object of the present invention to solve at least the above-described problems of conventional microphotography still cameras.

It is another object of the present invention to provide a still camera that performs microphotography without blurring photographs because of inherently occurring camera vibrations.

It is yet another object to provide an electronic still camera that performs microphotography without burred pictures caused by vibrations from quick-return mirror driving and front shutter curtain driving.

It is still yet another object of the invention to provide a two-way still camera that can switch between a microphotography mode and a normal photography mode.

In order to achieve the above and other objects, and to overcome the shortcomings in the prior art, still cameras according to embodiments of the present invention include a quick-return mirror, a charge-accumulating element, a mechanical shutter device having a front curtain and a rear curtain, a time monitoring device and an exposure control device.

In one embodiment according to the present invention, the quick-return mirror moves instantly to a position outside of the optical axis position in response to camera release operations (e.g., release switch or release button). The quick-return mirror returns to an original optical axis position when the shutter has finished closing. The charge-accumulating element acquires the object image. The front curtain exposes a light-receiving plane of the charge-accumulating element and after a photograph exposure time has elapsed, the rear curtain blocks the light-receiving plane of the charge-accumulating element. The time-monitoring device monitors a time period required for vibrations caused by the quick-return mirror movement to the position outside of the optical axis position are eliminated or minimized. Finally, the exposure time control device starts the front curtain when the time-monitoring device determines that the time period has passed. That is, because exposure of the imaging device begins after the vibration of the quick-return mirror has ended, microphotography without blurring can be performed using a still camera when the magnification of the microscope is not very great and the vibration of the front curtain driving has little influence, or when the vibration of the front curtain driving is slight enough not to influence the microphotography.

According to another embodiment of the present invention, the still camera includes an electronic shutter device that controls the exposure time of the charge-accumulating element after the start of the front curtain through a front curtain drive device. The front curtain drive device starts the front curtain almost simultaneously with the driving of the quick-return mirror. When the time-monitoring device determines that sufficient time has elapsed to eliminate the vibration of both the quick-return mirror and the front curtain driving, the exposure time control device starts the electronic shutter device and controls the exposure time. That is, because exposure of the charge-accumulating element is started after the vibrations of the front curtain and the quick-return mirror have stopped, microphotography without blurring becomes possible.

According to yet another embodiment of the present invention, the still camera can include a switch that switches between at least a normal photographic mode and a microphotographic mode. The time-monitoring device and the exposure time monitoring device are activated during the microphotographic mode. Also, because this embodiment realizes a still camera for both normal photography and microphotography, reduction of costs becomes possible.

According to still yet another embodiment of the present invention, the still camera is an electronic still camera or a silver halide still camera. That is, using the present invention, because microphotography can be performed with an electronic still camera an efficiency increase of the processing operations can be planned. Also, because microphotography can be performed with a silver halide camera, photography is possible casually without selecting time and place. That is, it has the advantage that the object range of microphotography is easily expanded.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein:

FIG. 5(a) to 5(d) shows a timing chart during the microphotographic mode in the electronic still camera of FIG. 4.

DETAILED DESCRIPTION OF PREFERRED EMBODIMENTS

Figure 1:
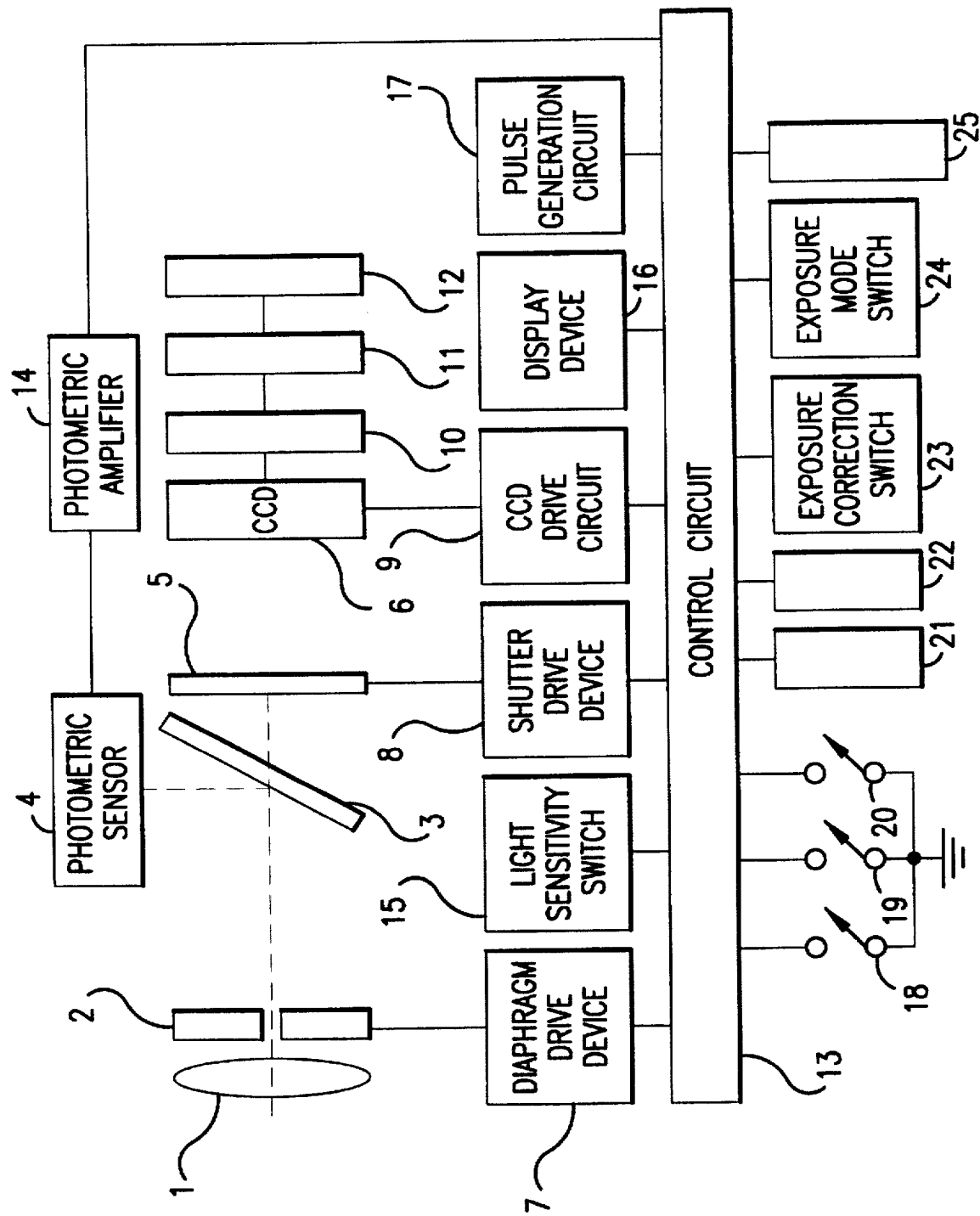
FIG. 1 shows a structural configuration of an electronic still camera according to one preferred embodiment of the present invention.

A first preferred embodiment of an electronic still camera according to the present invention will be described with respect to FIGS. 1–3. The electronic still camera is equipped with a photographic lens 1, a diaphragm 2, a quick-return mirror (called "mirror" below) 3, a photometric sensor 4, a mechanical shutter 5, a charge-accumulating element (called CCD below) 6, diaphragm drive device 7, a shutter drive device 8, a CCD drive circuit 9, a signal processing circuit 10, a compression circuit 11, a memory card 12, a control circuit 13 and a photometric amplifier 14 connected thereto, a light-sensitivity switch 15, a display device 16, a pulse generation circuit 17, a power switch 18, a half-depression switch 19, a full-depression switch (i.e., release switch) 20, a photography-reproduction selection switch 21, a photometric mode switch 22, an exposure correction switch 23, exposure mode switch 24, and a normal photography-microphotography selection switch 25 as shown in FIG. 1.

The luminous flux of an object, having passed through the photographic lens 1, is led to the diaphragm 2. The diaphragm is controlled based on commands from the diaphragm drive device 7 and the control circuit 13. The luminous flux of the object, having passed through the diaphragm 2, is led to the mirror 3. At the mirror 3, a part of the luminous flux is reflected to the photometric sensor 4 and a part of the luminous flux passes through the mirror 3 to the CCD 6 via the mechanical shutter 5.

The photometric sensor 4 in the first preferred embodiment includes multiple photometric elements. The photometric sensor 4 is a multiple-division photometric circuit that performs photometry of an object by dividing it into multiple regions. The output of each of the photometric elements is amplified to a suitable level by the photometric amplifier 14 and then input into the control circuit 13.

The mechanical shutter 5 is equipped with a front curtain and a rear curtain. The start and stop of each of the front and rear curtain (i.e., the opening and closing of the mechanical shutter 5) are controlled by the shutter drive circuit 8 based on commands from the control circuit 13.

The CCD drive circuit 9 controls the charge accumulation and the charge transfer of the CCD 6 based on commands from the control circuit 13. That is, the CCD 6, under the control of the CCD drive circuit 9, receives a quantity luminous flux of the object according to the opening and closing of the mechanical shutter 5. The CCD 6 accumulates the signal charge according to that received luminous quantity and outputs the accumulated signal charge as image data to the signal processing circuit 10.

The signal processing circuit 10 provides white noise adjustment, y correction, contour correction, etc., on the input image data as would be known to one of ordinary skill in the art. The sensitivity processing of the signal processing circuit 10 is switched by the sensitivity switch 15. The image data corrected by the signal processing circuit 10 undergoes data compression by the compression circuit 11 and is then stored in a memory card 12. Alternatively, there are types of electronic still cameras whereby the image data corrected by the signal processing circuit 10 is transmitted directly to the memory card 12 without applying the compression circuit 11.

The display device 16 displays information required for photography and reproduction received via the control circuit 13. The display device 16 can be attached, for example, to the top of the camera. The pulse generation circuit 17 provides pulse signals for the specified number of rotations performed by a command dial to the control circuit 13.

The power switch 18 turns on and off the power source coupled to each component of the camera. The half-depression switch 19 turns on when the release button is depressed half-way. Similarly, the full depression switch 20 turns on when the release button is fully depressed. The release button is not illustrated in FIG. 1, but it can be provided on the outside top of the camera, for example.

The photography-reproduction switch 21 determines whether to perform photography or to perform reproduction. The photometric mode switch 22 switches the photometric mode. The exposure correction switch 23 switches the amount of exposure correction. The exposure mode switch 24 is the switch that switches program mode, diaphragm priority mode, shutter priority mode, etc.

Also, the normal photography-microphotography selection switch 25 in the first embodiment switches to determine whether the camera performs normal photography or performs microphotography.

In addition to controlling the types of functions of the camera in accordance with the information received from the sensitivity switch 15, the photometric mode switch 22, the exposure correction switch 23 and the exposure mode switch 24, the control circuit 13 controls the release sequences corresponding to the status of the normal photography-microphotography selection switch 25 based on the operation of the full-depression switch 20 (i.e., release ON).

Operations of the first preferred embodiment shown in FIG. 1 will be explained with reference to FIGS. 2–3. The first preferred embodiment applies to an electronic still camera used when the microscopic magnification level is not high, but the vibration when the front curtain is driven during microphotography cannot be ignored. Also, the first preferred embodiment applies, for example, to an electronic still camera when the vibration while the front curtain is driven is so large in itself that it cannot be ignored.

Figure 2:
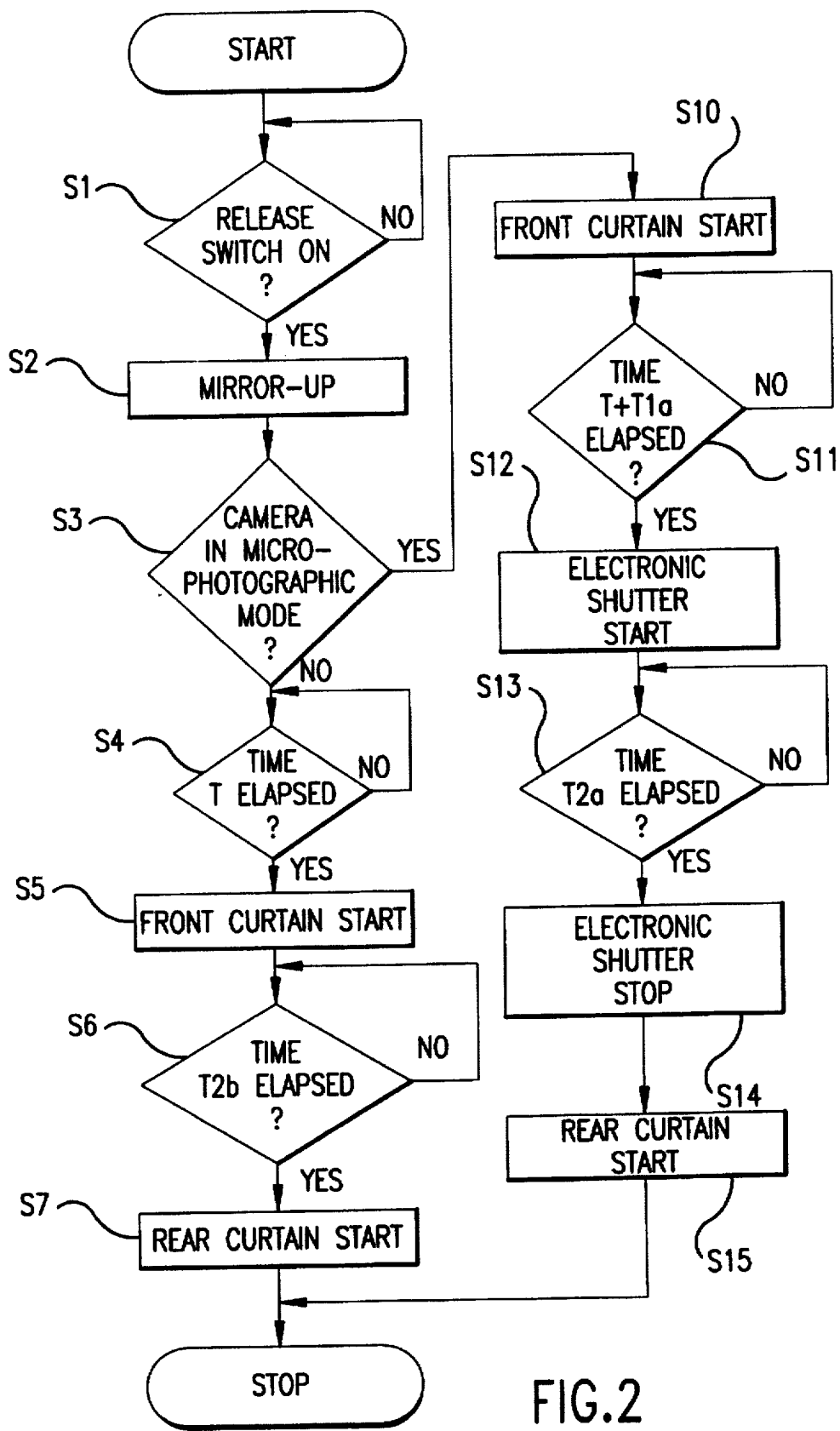
FIG. 2 shows a flow chart of the operations of the electronic still camera of FIG. 1.

In FIG. 2, after camera operations are started, control continues to step S1. In step S1 it is determined whether the full-depression switch 20 of a release switch is turned ON. Release switch ON 30 is shown in FIG. 3(a). If the release is ON, the decision of step S1 is affirmative (YES) and control continues to step S2. However, if the release switch is not ON, the decision in step S1 is negative (NO) and control returns to step S1. In step S2, the mirror 3 is moved to the position outside of the optical axis position (i.e, a mirror-up operation). As shown in FIG. 3(b), the mirror-up operation synchronizes with release ON 30, which is shown in FIG. 3(a). The mirror 3 reaches the specified position outside the optical axis position after the time T required for mirror-up has elapsed. However, as described above, it does not move immediately to that specified location, rather it moves while vibrating.

Next, control continues from step S2 to step S3 where it is determined whether the normal photography-microphotography selection switch 25 is in the microphotographic mode. When the normal photography-microphotography selection switch is not in the microphotographic mode, the decision made in step S3 is negative (NO) and control continues to steps S4–S7.

In steps S4–S7, the release sequences of the normal photographic mode are executed. These processes are identical to the operations of the conventional still camera shown and described with reference to FIGS. 6(a)–6(d). In step S4, the passage of the time T required for mirror-up is monitored. When the time T has elapsed, the decision in step S4 becomes affirmative (YES) and control continues to step S5. However, if the time T has not elapsed, then the decision in step S4 is negative (NO) and control returns to step S4 where the time monitoring process continues. In step S5, the control circuit 13 starts the front curtain by controlling the shutter drive circuit 8. Front curtain start 32 is shown in FIG. 3(c). From step S5 control continues to step S6 where the passage of the exposure time T2b is monitored. Next, when the exposure time T2b has elapsed, the decision in step S6 is affirmative (YES) and control continues to step S7. However, if the time T2b has not elapsed then the decision made in step S6 is negative (NO) and control returns to step S6 where the time monitoring process continues. In step S7, the control circuit 13 starts the rear curtain immediately upon the end of the exposure to block the CCD 6 via the shutter drive circuit 8.

When the camera is in the microphotographic mode, the decision made in step S3 is affirmative (YES) and control jumps to step S10 and the release sequences of the microphotographic mode shown in FIGS. 3(a)–3(d) are executed by performing the processes of steps S10–S15.

In step S10, the front curtain is started by controlling the shutter drive circuit 8 substantially simultaneously with the mirror-up operation. Front curtain start 32 is shown in FIG. 3(c). From step S10, control continues to step S11 where the elapsing of time T+T1a is monitored. When the vibration caused by driving the front curtain is equal to or greater than the vibration during mirror-up, or, when the magnification of the microscope is very large which increases the influence of the vibration caused by driving the front curtain, the front curtain is started earlier.

Figure 3:
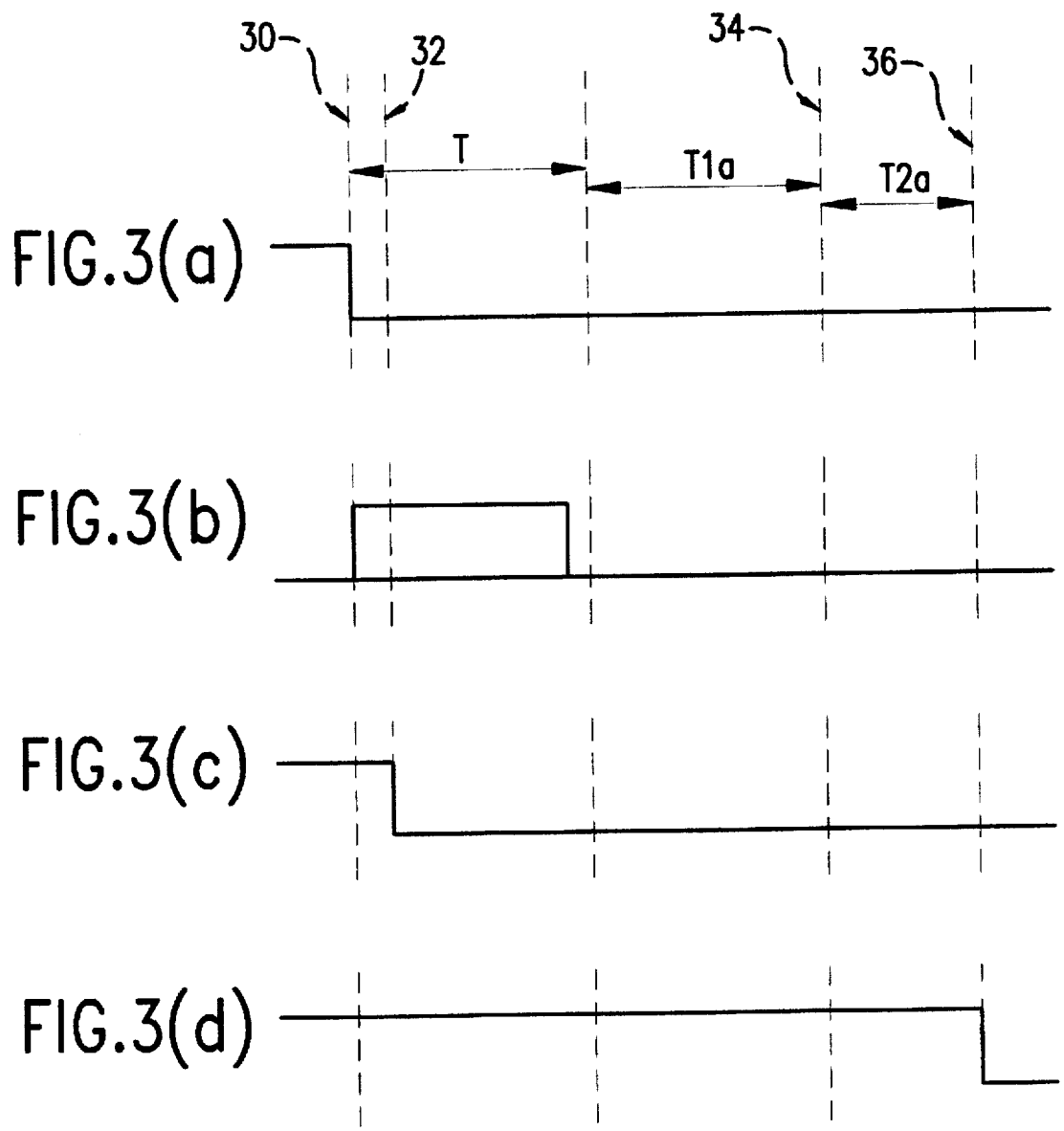
FIGS. 3(a) to 3(d) shows a timing chart during the microphotographic mode in the electronic still camera of FIG. 1.

As shown in FIG. 3, time T+T1a is the union of the time T required for mirror-up and the time T1a required for the vibrations during mirror-up and driving the front curtain come to a stop T1a. The amount of time required for the vibrations during mirror-up and driving the front curtain to stop or become minimal is set to an optimal time for each camera.

When, the time T+T1a has elapsed, the decision in step S11 is affirmative (YES) and control continues to step S12. In step S12, the control circuit 13 starts the electronic shutter of the CCD 6 by controlling the CCD drive circuit 9. Electronic shutter start 34 is shown in FIGS. 3(a)–3(d). However, if the time T+T1a has not elapsed, then the decision made in step S11 is negative (NO) and control returns to step S11 where the time monitoring process continues.

From step S12, control continues to step S13 where elapsing of an exposure time T2a is monitored. When the exposure time T2a has elapsed, the decision of step S13 is affirmative (YES) and control continues to step S14. In step S14, the electronic shutter is stopped to end the exposure. However, if the time T2a has not elapsed then the decision made in step S13 is negative (NO) and control returns to step S13 where the time monitoring process continues.

From step S14, control continues to step where the control circuit 13 starts the rear curtain to block the CCD 6 by controlling the shutter drive circuit 8. Rear curtain start 36 is shown in FIG. 3(d). From step S7 and step S15, the procedure ends.

Next, the operations of second preferred embodiment of an electronic still camera will be explained with reference to FIGS. 4–5. The second preferred embodiment can be used, for example, with an electronic still camera when the microscopic magnification is not very high and the vibration caused by driving the front curtain has minimal influence. The second preferred embodiment can also be used with an electronic still camera when the vibration caused by driving the front curtain is slight enough that there is no influence.

Figure 4:
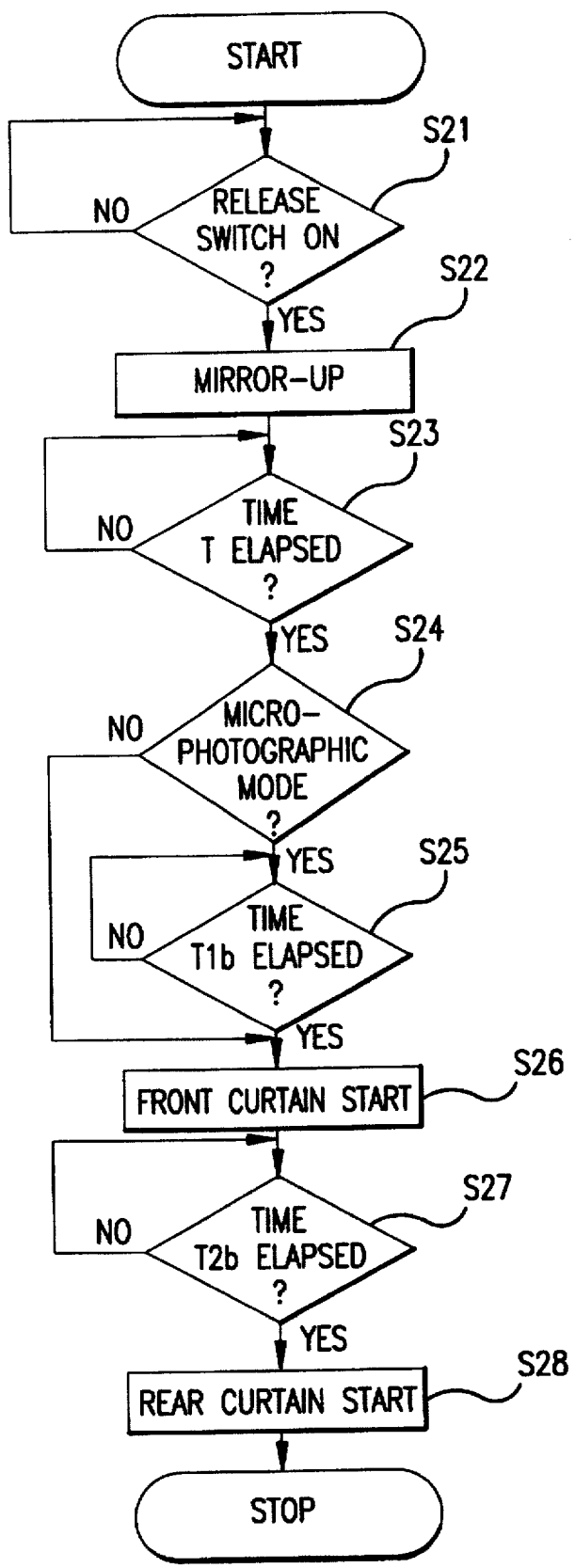
FIG. 4 shows a flow chart of the operations of an electronic still camera according to another preferred embodiment of the present invention.
Figure 6A:
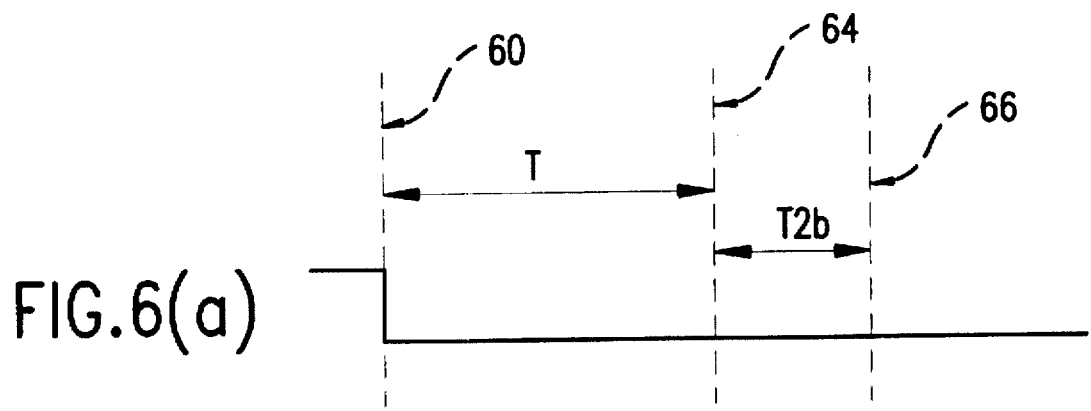
FIG. 6(a) to 6(d) shows a timing chart of the release sequences of a conventional electronic still camera.
Figure 6B:
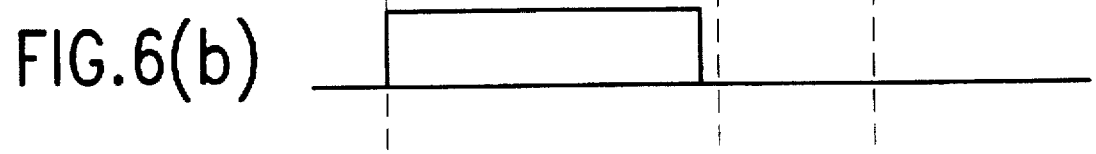
Figure 6C:
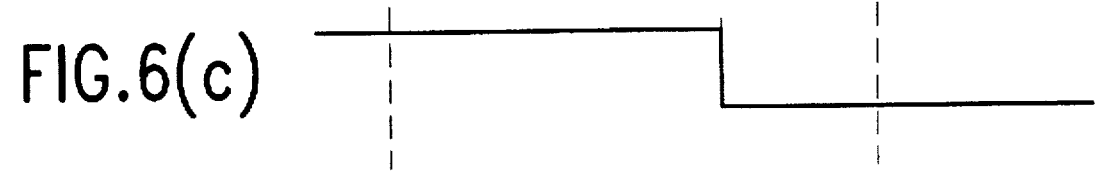
Figure 6D:
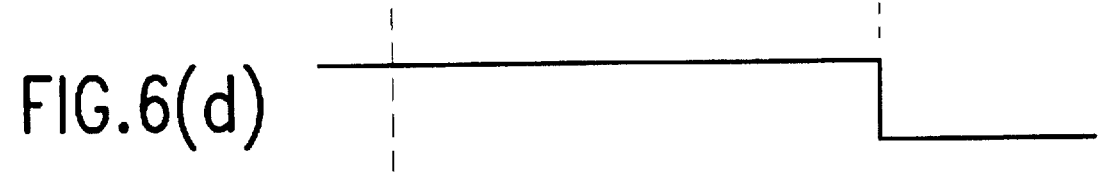

As shown in FIG. 4, after camera operations are started, control continues to step S21. In step S21, it is determined whether the full-depression switch of the release button is turned ON. Release ON 50 is shown in FIG. 5(a). If the release is ON, the decision of S21 is affirmative (YES) and control continues to step S22. However, if the release button is not ON, the decision in step S21 is negative (NO) and control returns to step S21. In step S22, the mirror 3 is moved to the position outside of the optical axis position. As in the first preferred embodiment, step S22 simultaneously starts the mirror-up operation with the release ON 50. After the time T has elapsed the mirror 3 reaches the specified position outside the optical axis position. Release switch timing is shown in FIG. 5(a) and the mirror-up timing is shown in FIG. 5(b).

Next, control continues to step S23 where the passage of the time T required for mirror-up is monitored. When the time T has elapsed, the decision made in step S23 is affirmative (YES) and control continues to step S24. However, if the time T has not passed, then the decision made in step S23 is negative (NO) and control returns to step S23 where the time monitoring process continues.

In step S24, it is determined whether the setting status of the normal photography-microphotography selection switch 25 is set to the microphotographic mode. When the camera is in the microphotographic mode, the decision of step S24 is affirmative (YES) and continues to step S25. In step S25, the passage of the time T1b for the vibration during mirror-up to stop is monitored. When the time T1b has elapsed, the decision in step S25 becomes affirmative (YES) and control continues to step S26. However, if the time T1b has not elapsed, then the decision in step S25 is negative (NO) and control returns to step S25 where the time monitoring process continues. In step S26, the control circuit 13 starts the front curtain by controlling the shutter drive circuit 8. Front curtain start 54 is shown in FIG. 5(c). From step S26 control continues to step S27 where the passage of the exposure time T2b is monitored.

However in step S24, when the camera is not in the microphotographic mode, the decision of step S24 is negative (NO) and control jumps to step S26. In step S26, the control circuit 13 immediately starts the front curtain by controlling the shutter drive circuit 8, and then control continues to step S27.

Next, when the exposure time T2b has elapsed, the decision in step S27 is affirmative (YES) and control continues to step S28. However, if the time T2b has not elapsed then the decision made in step S27 is negative (NO) and control returns to step S27 where the time monitoring process continues. In step S28, the control circuit 13 starts the rear curtain immediately upon the end of the exposure to block the CCD 6 by controlling the shutter drive circuit 8. Rear curtain start 56 is shown in FIG. 5(d). From step S28, the procedure ends.

From the above description of the first and second embodiments, the order of sequence control is simplified in the second embodiment. Further, in the above electronic still camera embodiments because an electronic shutter for the CCD 6 can be used, the starting and stopping of the electronic shutter can be performed within the period of the exposure time T2b.

Also, it is clear from the above explanation that the second preferred embodiment can be used with silver halide still cameras having photographic film as the imaging device.

In the preferred embodiments, the normal photographic-microphotographic switch is an independent switch, (e.g., the normal photography-microphotography selection switch 25), but to reduce the number of installed switches, this function may be provided as an addition to a pre-existing switch. Further, an independent selection switch would be unnecessary in a camera that only performs microphotography.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A still camera that performs microphotography, comprising:

a quick-return mirror that moves between a position along an optical axis position and a position outside the optical axis, wherein the quick-return mirror moves to the position outside the optical axis in response to camera release operations;

imaging means for acquiring an object image;

shutter means for controlling an exposure time of the imaging means, wherein the quick-return mirror returns to the position along the optical axis after the shutter means completes exposure of the imaging means during the exposure time;

a time-monitoring means for monitoring the passage of time until a vibration time has elapsed, wherein the vibration time is the time required to substantially eliminate vibrations caused by the quick-return mirror moving from the position along the optical axis to the position outside the optical axis; and an exposure time control means for starting the shutter means when the time-monitoring means determines that the vibration time has elapsed.

2. The still camera according to claim 1, wherein the shutter means comprises mechanical shutter means including a front curtain for exposing the imaging means and a rear curtain for blocking the imaging means, and wherein the exposure time control means starts the front curtain of the mechanical shutter means when the vibration time has elapsed.

3. The still camera according to claim 2, further comprising switching means for switching the camera between at least a normal photographic mode and a microphotographic mode, wherein the time-monitoring means and the exposure time control means are activated when the microphotographic mode is specified by the switching means.

4. The still camera according to claim 1, wherein the imaging means is a charge-accumulating element.

5. The still camera according to claim 1, wherein the shutter means comprises:

mechanical shutter means including a front curtain for exposing the imaging means and a rear curtain for blocking the imaging means, and an electronic shutter means for controlling the exposure time of the imaging means after a start time of the front curtain, wherein the vibration time includes a time required to substantially eliminate vibrations caused by movement of the front curtain, wherein the exposure time control means starts the electronic shutter means when the vibration time has elapsed, and wherein the rear curtain starts when the exposure time has elapsed; and further comprising front curtain drive means for driving the front curtain, wherein the front curtain drive means starts the front curtain at a front curtain start time that is substantially simultaneous with the moving of the quick-return mirror to the position outside the optical axis.

6. The still camera according to claim 5, further comprising switching means for switching the camera between at least a normal photographic mode and a microphotographic mode, wherein the time-monitoring means and the exposure time control means are activated when the microphotographic mode is specified by the switching means.

7. The still camera according to claim 1, wherein the imaging means is photographic film.

8. The still camera according to claim 1, wherein the still camera is a silver halide still camera.

9. The still camera according to claim 1, wherein the imaging means further comprises a light receiving plane, wherein the front curtain moves to expose the light receiving plane, and wherein the rear curtain moves to block the light receiving plane.

10. A still camera that performs microphotography, comprising:

a release switch;

a quick-return mirror that moves between a position along an optical axis and a position outside the optical axis, wherein the quick-return mirror moves to the position outside the optical axis in response to the release switch;

a charge accumulating element that receives light from an object image;

a shutter that opens and closes to control an exposure time of the charge-accumulating element, wherein the quick-return mirror returns to the position along the optical axis after the shutter closes;

a vibration timer that determines when a vibration time has elapsed, wherein the vibration time is a time required to substantially eliminate vibrations caused by movement of the quick-return mirror from the position along the optical axis to the position outside the optical axis; and an exposure time controller that initiates the shutter when the vibration time has elapsed.

11. The still camera according to claim 10, wherein the shutter comprises a mechanical shutter that includes a front curtain that opens to expose the charge-accumulating element and a rear curtain that closes to block the charge-accumulating element, and wherein the exposure time controller initiates opening of the front curtain of the mechanical shutter when the vibration time has elapsed.

12. The still camera according to claim 11, further comprising a switch that changes the camera between a normal photographic mode and a microphotographic mode, wherein the vibration timer and the exposure time controller operate only when the microphotographic mode is set.

13. The still camera according to claim 10, wherein the shutter comprises:

a mechanical shutter that includes a front curtain that opens to expose the charge-accumulating element and a rear curtain that closes to block the charge-accumulating element, and an electronic shutter that controls an exposure time of the charge-accumulating element after the front curtain has opened, wherein the vibration time further includes sufficient time to substantially eliminate vibrations caused by movement of the front curtain, wherein the exposure time controller starts the electronic shutter when the vibration time has elapsed, and wherein the rear curtain closes when the exposure time has elapsed; and further comprising a front curtain driver that drives the front curtain, wherein the front curtain driver opens the front curtain substantially simultaneously with the moving of the quick-return mirror to the position outside the optical axis.

14. The still camera according to claim 10 further comprising a switch for switching the camera between a normal photographic mode and a microphotographic mode, wherein the vibration timer and the exposure time controller are activated when the microphotographic mode is specified by the switch.

15. The still camera according to claim 10, wherein the charge-accumulating element is photographic film.

16. The still camera according to claim 10, wherein the charge-accumulating element comprises a light receiving plane, wherein the shutter opens to expose the light receiving plane and wherein the shutter closes to block the light receiving plane.

17. A method of operating a still camera that performs microphotography, comprising:

depressing a release switch to initiate an exposure operation;

moving a quick-return mirror to a position outside of an optical axis in response to the release switch depression;

monitoring the passage of time until a vibration time has elapsed, wherein the vibration time is a time required to substantially eliminate vibrations caused by movement of the quick-return mirror from the position along the optical axis to the position outside of the optical axis; and exposing an imaging device to light from an object image for an exposure time, using a shutter, after the vibration time has elapsed.

18. The method according to claim 17, wherein the exposing step comprises:

driving a front curtain of a mechanical shutter means to expose the imaging device; and driving a rear curtain of the mechanical shutter to block the imaging device when the exposure time has elapsed.

19. The method according to claim 17, further comprising the step of switching the still camera between at least a normal photographic mode and a microphotographic mode, wherein the monitoring step and the exposing step are performed only when the camera is in the microphotographic mode.

20. The method according to claim 17, wherein the exposing step comprises the steps of:

opening a front curtain of a mechanical shutter to expose the imaging device substantially simultaneously with the moving the quick-return mirror to the position outside the optical axis;

beginning exposure of the imaging device after opening the front curtain by starting an electronic shutter after the vibration time has elapsed, wherein the vibration time includes a time required to substantially eliminate vibrations caused by movement of the front curtain; and ending exposure imaging device after the exposure time has elapsed.

* * * * *